Oct. 6, 1970  R. V. EVANS  3,532,584
MACHINE FOR LAMINATING TEXTILE FABRICS
Filed July 19, 1967
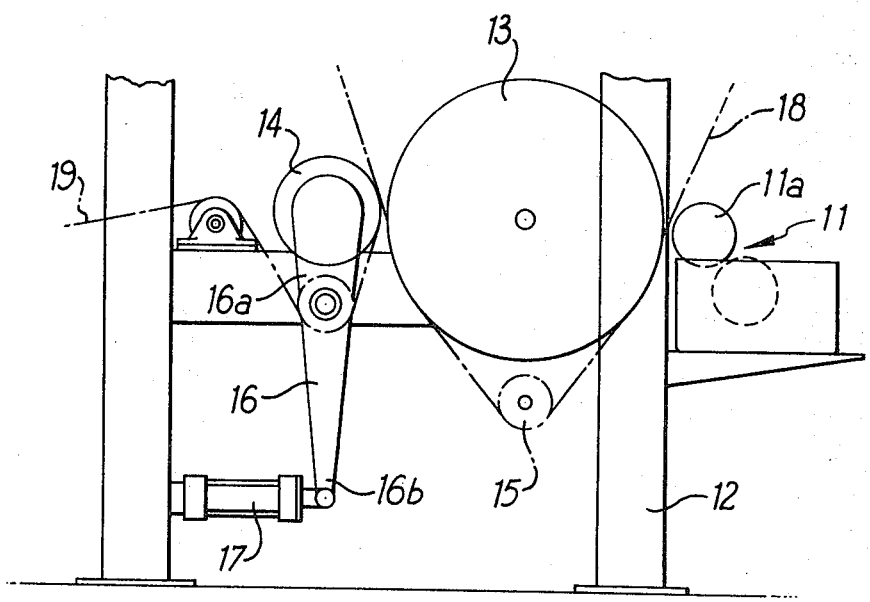
INVENTOR
Raymond V. Evans
BY
ATTORNEY United States Patent Office 3,532,584
Patented Oct. 6, 1970

3,532,584
MACHINE FOR LAMINATING TEXTILE FABRICS
Raymond V. Evans, Blackburn, England, assignor to Singer-Cobble Limited, Blackburn, England
Filed July 19, 1967, Ser. No. 654,402
Int. Cl. B32b 31/08
U.S. Cl. 156—549                    6 Claims

ABSTRACT OF THE DISCLOSURE

Machines for laminating textile fabrics which comprise a first backing roller means for supporting a first fabric on its periphery and first and second treatment rollers symmetrically disposed relative to the backing roller, one treatment roller being a coating roller and the other being being a pressure or nip roller. The pressure roller is adjustable relative to the backing roller for varying the contact pressure between the pressure roller and the backing roller.

BRIEF SUMMARY OF INVENTION

It is known in the laminating machine art to provide a backing roller to serve a particular roller as for example the coating roller. In accordance with the present invention, a laminating or like machine is characterized by a backing roller having a plurality of treatment rollers in contact therewith, with the said rollers being arranged at oppositely disposed points and being urged into contact with said backing roller by appropriate means. Through the use of the apparatus of the present invention, variations in the tension of the fabrics or materials to be laminated is minimized so that problems such as curling or distortion in the finished product will be substantially eliminated. One of the rollers in contact with the backing roller is preferably a nip roller for nipping two fabrics or like materials into contact with one another and in accordance with the invention means are provided for varying the contact pressure of the nip roller with the materials to be laminated and the backing roller.

Accordingly, it is a primary object of the invention to provide an improved backing roller structure which simplifies the construction of such as a laminating machine and gives rise to a reduction in the cost thereof.

It is a further object of the invention to provide a novel apparatus for a laminating machine or the like wherein variations in the tension of the materials to be laminated is minimized.

Other objects and advantages of the invention will be best understood upon reading the following description with the accompanying drawing.

BRIEF DESCRIPTION OF DRAWING

The figure of the drawing diagrammatically shows a portion of a laminating machine and illustrating the invention thereof.

DETAILED DESCRIPTION OF THE INVENTION

Referring to the drawing, a laminating machine is illustrated therein as including a coating head 11 movably mounted on the machine frame 12, a backing roller 13 against which the coating roller 11a of the coating head normally bears, and a pivotally mounted nip or pressure roller 14, the said pressure roller 14 preferably normally contacts the backing roller 13 at a point diametrically opposed to the coating roller 11a. As is known in the art, the coating head 11 including the coating roller 11a may further include a trough containing an adhesive which is picked up by a roller disposed in the trough, shown in phantom lines in the drawing, with the adhesive being then transferred to the coating roller 11a for deposition onto a fabric or like material.

The backing roller 13 is preferably provided with a non-stick surface thereto and is mounted in journals secured to the machine frame work 12, with such frame work also supporting a guide roller 15 directly below the backing roller 13 and spaced therefrom. Preferably, the coating used on the backing roller 13 is of the type including such compounds as polytetrafluoroethylene.

The pressure roller 14 is rotatably secured at its upper ends 16a by two spaced parallel levers 16 only one of which is shown in the figure, the said levers being pivotally mounted intermediate of their ends on the frame work 12. The lower ends 16b of the levers are coupled to a fluid responsive actuating mechanism such as a hydraulic piston and cylinder arrangement 17. The piston and cylinder arrangement 17 could likewise be pneumatically actuated or actuated through a mechanical lever system. The actuation of the piston and cylinder arrangement 17 will increase or decrease the pressure between the pressure roller 14 and the backing roller 13 so that the contacting pressure between the materials to be laminated can be varied through actuation of the piston and cylinder arrangement 17.

In use, a material such as a fabric or the like 18 to be laminated passes between the coating roller 11a and backing roller 13 where an adhesive is applied to one surface of the fabric, fabric 18 then passing around the guide roller 15 to return to the backing roller peripheral surface where it is passed through the nip between the nip or pressure roller 14 and the backing roller 13. A second material or fabric 19 to be laminated also passes through the nip between the roller 14 and roller 13 and is caused to adhere to the first material 18 by the adhesive applied thereto and the applied pressure by the pressure roller 14. It will be understood, of course, that the invention is not limited to the lamination of two fabrics and it is within the scope of the invention to apply the mechanism of the invention to the lamination of such materials as foam to fabric, rubber, vinyl and other known combinations of materials.

From the nip the two materials may be passed through a heated drying or curing roller (not shown) as is well known in the art and thence to a take-up roll. A backing material may be applied to the laminated structure prior to rollup, if desired.

The provision of a non-stick film or coating on the backing roller and the use of a single backing roller for the two spaced treatment rollers 11a and 14 minimizes the difference in tension at the two pressure points against the backing roller 13 and thus insures that no tension is built into the first material 18 before lamination, thereby avoiding curling or distortion in the finished product as often occurs in prior known laminating machines. Instead of a single guide roller 15, it is also within the scope of the invention to provide an adjustable roller or rollers arranged to give a variable path length between the coating head and the nip to thereby allow a limited drying off or partial curing of the adhesive should this be necessary.

Although the invention has been described in its preferred form with a certain degree of particularity, it should be understood that the present disclosure has been made of a preferred form by way of example and numerous changes in the details of construction the combination and arrangement of parts may be resorted to without departing from the spirit and scope of the invention.

Having thus set forth the nature of this invention, what I claim herein is:

1. In a laminating machine for laminating fabrics or the like, a backing roller for supporting a first fabric on its outer periphery, a first treatment roller disposed adjacent to said backing roller for contacting said fabric at one region of said backing roller periphery, a second treatment roller disposed in nipping relationship with said backing roller for pressing a second fabric into contact with said first fabric and against a second region of said backing roller periphery, said first and second treatment rollers being symmetrically disposed relative to said backing roller, said second treatment roller having means operably connected thereto for varying the contact pressure between said fabrics whereby the contact of said treatment rollers relative to said backing roller periphery minimizes differences in the tension of said first fabric between said treatment rollers, and guide roller means disposed between said first and second treatment rollers and in spaced relationship with said backing roller.

2. In a laminating machine as recited in claim 1 wherein said second treatment roller is pivotally mounted.

3. In a laminating machine as recited in claim 1 wherein said second treatment roller is supported by pivoted arm means with one end of said pivoted arm means being connected to means for urging said second treatment roller into contact with said backing roller.

4. In a laminating machine as recited in claim 3 wherein said means for urging said second treatment roller into contact with said backing roller includes a piston and cylinder mechanism.

5. In a laminating machine as recited in claim 1 wherein said backing roller periphery is coated with a non-stick film of the type including polytetrafluoroethylene.

6. In a laminating machine as recited in claim 1, wherein said first treatment roller is disposed for depositing an adhesive on the side of said first fabric opposite from the side supported on said backing roller.

References Cited

UNITED STATES PATENTS

| Re. 8,883 | 9/1879 | Palmer | 156—549 X |
| 1,858,375 | 5/1932 | Schroeder et al. | 156—495 X |
| 2,993,527 | 7/1961 | Moser et al. | 156—555 X |
| 3,291,672 | 12/1966 | Sonneborn et al. | 156—555 X |

BENJAMIN A. BORCHELT, Primary Examiner

S. C. BENTLEY, Assistant Examiner